July 21, 1959 D. J. VONDRAN 2,895,341

MOTOR SPEED CHANGER

Filed June 5, 1957 4 Sheets-Sheet 1

INVENTOR.
Daniel J. Vondran
BY
Watson D. Harbaugh
ATTORNEY

July 21, 1959 — D. J. VONDRAN — 2,895,341

MOTOR SPEED CHANGER

Filed June 5, 1957 — 4 Sheets-Sheet 2

INVENTOR.
Daniel J. Vondran
BY
ATTORNEY

July 21, 1959 D. J. VONDRAN 2,895,341

MOTOR SPEED CHANGER

Filed June 5, 1957 4 Sheets-Sheet 3

INVENTOR

Daniel J. Vondran

BY Jvaton ? Harbaugh

ATTORNEY

July 21, 1959

D. J. VONDRAN 2,895,341

MOTOR SPEED CHANGER

Filed June 5, 1957

4 Sheets-Sheet 4

INVENTOR

Daniel J. Vondran by Watson D. Harbaugh

ATTORNEY 2,895,341

MOTOR SPEED CHANGER

Daniel J. Vondran, Chicago, Ill., assignor to Webcor, Inc., Chicago, Ill., a corporation of Illinois Application June 5, 1957, Serial No. 663,689

6 Claims. (Cl. 74—199)

This invention relates to sound reproducing apparatus, and more particularly to an automatic record changer of the multi-speed type which handles records of different diameters indiscriminately, and wherein the turntable speed may be varied automatically in response to the diameter of the record tablet deposited on the turntable upon initiation of a cycle of automatic operation. The invention is an improvement over the inventions disclosed in the application of Colin B. Dale, Serial No. 446,469, and that of Edwin S. Bara, Serial No. 552,827, filed December 13, 1955, the disclosures of these inventions being incorporated herein by reference. However, the present invention also has application to record changers not adapted to produce automatic change of speed for different sized record tablets, it being understood that the invention is particularly adapted, however, to use with "intermix" machines.

A principal object of the invention is to provide an automatic record changer wherein the speed control means may be cam actuated so that the change from one speed to another takes place with great simplicity and ease.

Another object is to provide an automatic record changer of the type indicated, in which the speed control lever is adapted to actuate two sets of cams for effecting lateral movement of a tire adapted to contact and be rotated by a stepped spindle driven by the motor of the device, and at the same time to actuate a cam for effecting vertical adjustment of the tire.

Another object of the invention is to afford a set of cam means for integral connection and simultaneous operation as described, in which each of the cams actuates a lever system in complementary relationship such that the raising and lateral movements of the tire are synchronized.

Another object of the invention is to provide a speed control mechanism as described, wherein the diameter of the stepped spindle and the diameter of the tire have a complementary relationship such that the control is accurate at each point on the spindle for the desired record speed without incurring frictional contact between the tire and the spindle, such as would "grind in" the tire.

Another object of the invention is to provide speed control means as described as well as means for urging or biasing the tire into engagement with each of the seried steps on the spindle.

Another object is to provide record speed means as described, in which the tire can move inwardly and outwardly relative to a vertical spindle when a relatively large step adjustment is required, but slide over a step which may be relatively small to effect the successive speed changes required in conventional record players.

Other objects and advantages of the invention will become apparent as the description proceeds in accordance with the drawings, in which similar reference characters relate to similar parts, and in which.

Figure 1:
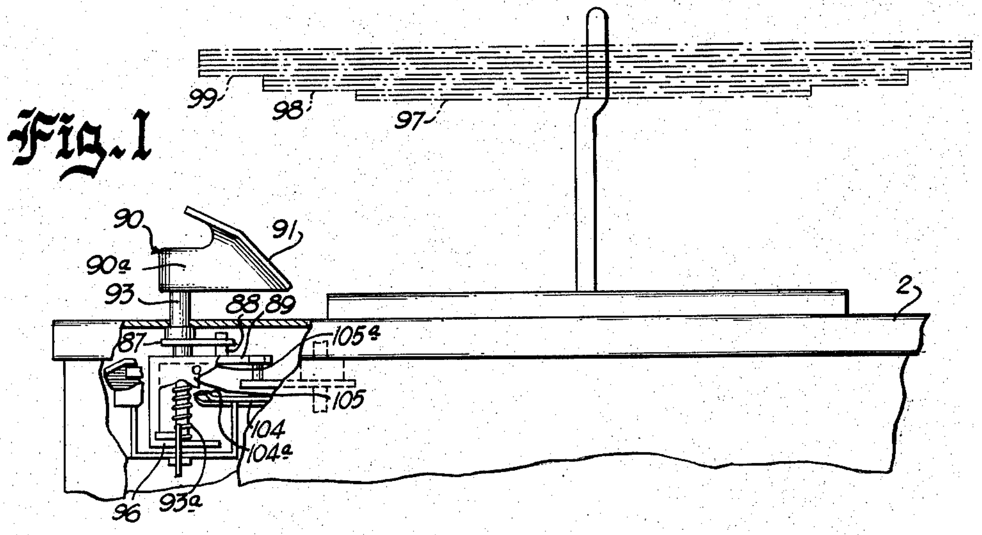
Figure 1 is an elevational view, partly broken away and partly in section, of an automatic record changer made in accordance with the present invention, and showing a portion of the speed control mechanism.
Figure 2:
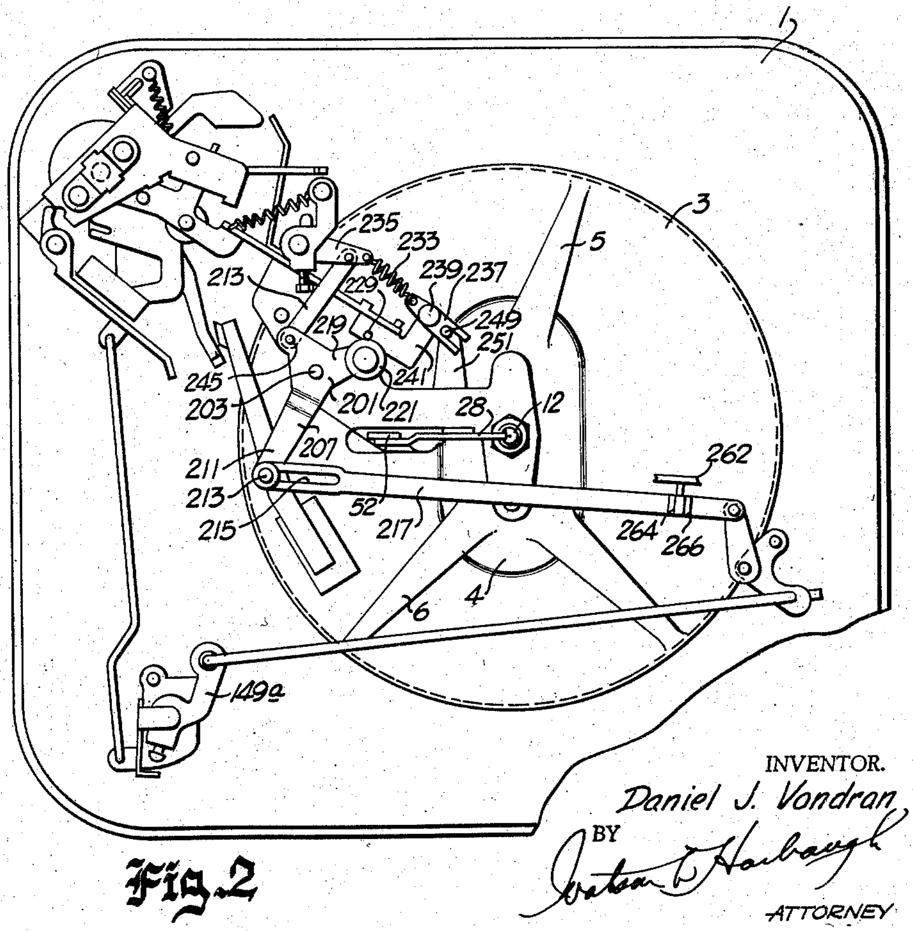
Figure 2 is a bottom plan view of the record changer of Figure 1, showing the speed control mechanism in operative position.

Referring now to the drawings, and more particularly to Figures 1 and 2, the automatic record changer of the present invention comprises a motor board 1 of thin sheet metal stiffened by a marginal flange 2, and having a central well 3 in which the turntable 10 is rotatably mounted about a non-rotating spindle mechanism 13 of the type shown in the said Dale application. The central well 3 is provided with an oblong depression 4 connected with the marginal edges of the well by means of a plurality of radially extending channel corrugations 5, 6 and 7.

The end 12 of the spindle assembly 13 is connected at one end to a rocker arm 28 pivotally mounted to the undersurface of the motor board 1 to actuate the record driving mechanism. The other end of the rocker arm 28 carries a roller 52 which extends through a suitable opening and into engagement with a cam path (not shown) formed on the underside of a main central cam gear 29 shown fragmentarily in Figure 3. The cam path has a rise surface for cyclic operation of the spindle assembly upon rotation of the cam gear 29. The cam rise is so located so as to turn the record drive with a seires of operations which include initiation of rotation of the cam gear 29 at the termination of the reproduction of the record, raising a tone arm (not shown) to a substantially horizontal position, swinging the tone arm outwardly to its limit position, and swinging the tone arm inwardly to a position corresponding to the initial reproducing position of a record of a particular diameter. For the latter purpose, an indexing assembly 90 (Figure 1) is provided for limiting the backswing of the tone arm. As in the application of Dale and Bara, supra, the indexing assembly 90 includes a flag **90*a* mounted on a shaft 93. The flag 90*a* has an inclined face 91 which may be engaged either by a 10-inch record indicated by reference numeral 98, or by a 12-inch record indicated by reference numeral 99. A 7-inch record, such as indicated by reference numeral 97, preferably does not engage the sloping face 91 of the flag 90*a***, and in this connection it should be noted that the tone arm normally is carried inwardly to a position just inside the periphery of a 7-inch record.

The indexing assembly 90 normally rests during reproduction of a record tablet in a position in which the flag 90*a* is clear of the periphery of a 12-inch record.. By this arrangement, any record tablet regardless of the size, may be removed manually without interference from the flag 90*a*. At the initiation of an automatic cycle of operation, however, the flag 90*a* will automatically move to the record interference position shown in Figure 1. If a 10-inch record is dropped, its edge contacts the edge of the flag and cams it outwardly enough to fall clear of it. The shaft 93 is rotated a predetermined distance by this camming, and consequently inward movement of the tone arm is limited by a stepped stop described clearly in applications, Serial Nos. 446,469 and 552,827, in suitable position so that the tone arm is dropped in the proper position for a 10-inch record. Likewise, the dropping of 12-inch record cams the flag outwardly further than a 10-inch record does, and rotates the shaft 93 a greater distance with the result that the travel of the tone arm is limited by a stepped stop in another position and the tone arm is dropped in the proper place to reproduce a 12-inch record. After a record has been deposited on the turntable, the flag 90*a* again moves to its outermost position.

At the initiation of each automatic cycle, the cam gear 29 is rotated one full revolution. An undulating groove 43 is formed in the cam gear 29. The groove 43 has an axial component of follower movement as well as a radial component. In groove 43 rides a cam follower pin 42 which is mounted on the inner end of a rocker arm 44 pivotally mounted on a bracket 47, which in turn is rotatably mounted on a stub shaft 48. The shaft 48 is fixedly secured to a reinforcing plate 21 attached to the underside of the motor board 1. Movement of the pin 42 within the groove 43 provides radial as well as lateral movement of the rocker arm 44 to afford four operations, namely, an upward movement to lift the tone arm to clear the turntable, movement of the tone arm radially outwardly to an inoperative or resting position in which another record tablet can be deposited on the turntable by drop mechanisms, movement of the tone arm back to a position above the record tablets, and, lowering the arm to its sound reproduction contact with the sound track of the record cabinet.

At the outer end of the rocker arm is formed a lever 104 (see Figure 1) which is operative to actuate the indexing assembly as the rocker arm moves vertically and horizontally in response to the movement of pin 42 in groove 43 in cam gear 29. Adjacent this end, a channel-shaped bracket 96 is mounted upon the shaft 93 and is normally urged into the lower position shown in Figure 1 by means of a spring 93*a*. A latch toggle 105 is pivotally provided on one side of the bracket 96 by a stepped cam plate forming the upper arm of the bracket 96.

The toggle 105 has a shoulder 105*a* which engages the undersurface of the cam plate 89 to prevent counterclockwise rotation of the toggle, as viewed in Figure 1. On its lower edge, the toggle 105 has a projection 105*b*. As the lever 104 moves upwardly in response to movement of the pin 42 in the groove 43, its upturned end 104*a* locks behind the projection 105*b* and as the lever 104 moves transversely, it urges the bracket 96 in a counterclockwise direction as viewed from the top in Figure 1. This motion is transmitted to the shaft 93 by means of a pin 88 mounted on the top surface of the cam plate 89. The pin 88 is received in a slot formed in the outer end of a crank 87 which is fixedly secured to the shaft 93. As the flag 90*a* is thus brought to its innermost position, the end 104*a* of the lever 104 slips from under the point of the projection 105*b*, and the bracket 96 is again returned to its lower position by the force of the spring 93*a*.

If a 10-inch record should be dropped, impact on the flag 90*a* rotates the shaft 93, and consequently the bracket 96, in a clockwise direction as viewed from the top in Figure 1, so that a higher shoulder of the stepped cam plate 89 is presented to interfere with the motion of pin 103 mounted on a lever 63 forming a part of the tone assembly. As explained before, this shoulder is calibrated so that the tone arm is dropped in the proper position to initiate sound reproduction of the 10-inch record. When the tone arm drops into operative position, the lever 63 also drops to a position in which the pin 103 is out of interfering relation with the cam plate 89, and the tone arm is free to track in the grooves and traverse a record tablet.

As the pin 103 moves into contact with one of the shoulders on the cam plate 89, the lever 104 is moved laterally into contact with the inner face of the projection 105*b*. The toggle 105 is thus rotated in a clockwise direction until the end 104*a* of the lever 104 again assumes a rocking relationship with respect to the projection 105*b*. As the lever 104*a* moves to the left as viewed in Figure 1, it engages a side edge 96*a* of the bracket 96 to rotate the bracket 96 and consequently the flag 90*a* in a clockwise direction as viewed from the top in Figure 1, until the flag 90*a* assumes its outer position clear of even the 12-inch records. In the present invention, the speed of the turntable is changed automatically to correspond with the diameter of the record deposited on the turntable. A 7-inch record is conventionally recorded at 45 r.p.m., a large majority of the 10-inch and 12-inch records made today are recorded at 33⅓ r.p.m., and some of the older 10-inch and 12-inch records are recorded at 78 r.p.m., provision being made for manual control to reproduce these records at their correct speed. This may be done by manual manipulation not forming a part of the invention, and described hereinafter.

By the present arrangement, the turntable speed may be changed from its normal 45 r.p.m. setting to a setting for reproduction of 33⅓ r. p.m. of a 10-inch or 12-inch record. As pointed out above, the flag 90*a* at the initiation of each automatic cycle, automatically moves into a position in which the tone arm will be moved inwardly the proper distance to reproduce a 7-inch record at 45 r.p.m.

Figure 3:
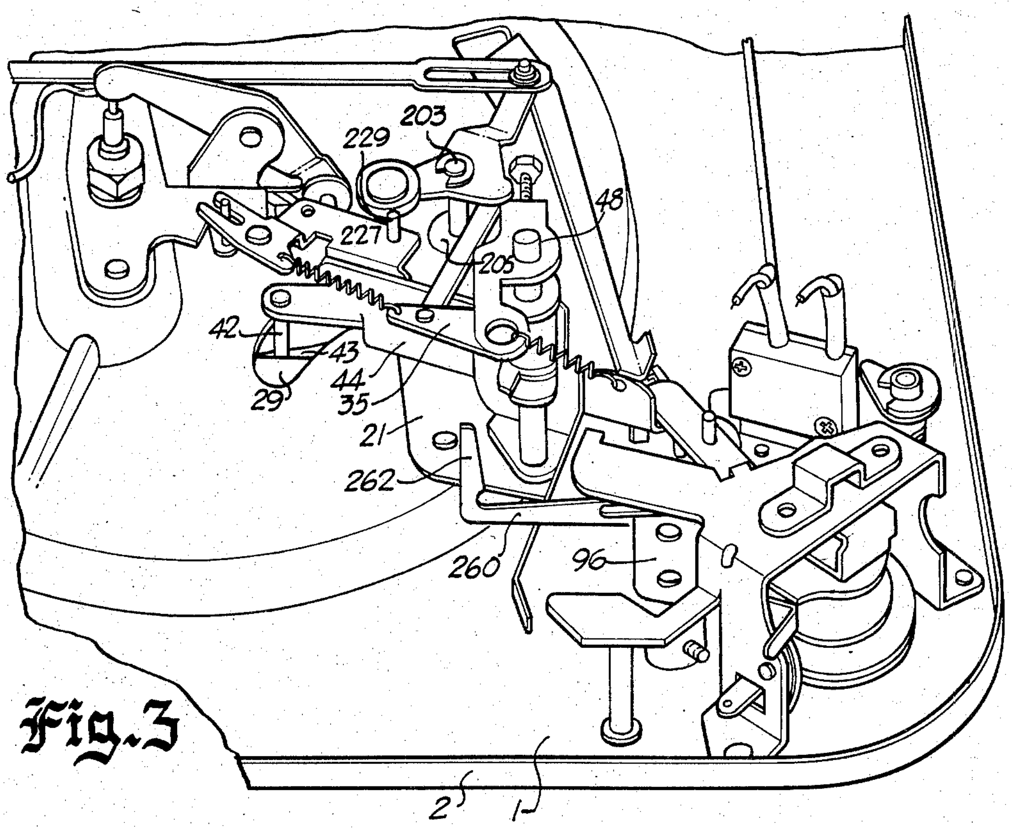
Figure 3 is a perspective view of the automatic speed changing mechanism of the present invention shown in operative relation to the tone arm control mechanism and indexing assembly therefor.

Referring now more particularly to Figures 2 and 3, there is shown a mechanism for automatically changing the speed of the turntable to rotate at 33⅓ r.p.m. if a 10-inch or 12-inch record strikes the inclined face 91 of the flag 90*a* as it drops onto the turntable, and for changing the speed of the turntable back to 45 r.p.m. at the initiation of each automatic cycle.

The mechanism for accomplishing this speed change includes a bell crank 201 rotatably mounted on a pivot 203 affixed to the plate 21 in spaced relation to the stub shaft 48. To assure movement of the bell crank 201 in a horizontal plane only, a bracket 205 is formed integrally with the bell crank and has a portion extending substantially parallel therewith and apertured for reception of the shaft 203. The bell crank 201 is generally tripartite in construction, and includes an elongated arm 207 having an annularly offset portion 209 and an end portion 211 at the other end of which is secured pin 213. The pin 213 is received in a slot 215 in a push rod 217 which is effective upon actuation to change the speed of the turntable in a manner hereinafter described, in accordance with the invention.

The bell crank 201 is further provided with an arm 219 which, in the present instance, has a rotatable washer 221 engaged by a mechanism hereinafter described for rotation of the bell crank 201 in one direction or the other for movement of the rod 217 to the left as viewed in Figure 2, to change the turntable speed setting from 45 r.p.m. to 33⅓ r.p.m. when a record of 10-inch diameter strikes the sloping face 91 of the flag 90*a*, and for movement of the rod 217 to the right as viewed in the same figure, to change the turntable setting from 33⅓ to 45 r.p.m. when a record of 7-inch diameter is dropped upon the turntable. The mechanism for effecting the initial operations whereby speed change is accomplished may be in accordance with that disclosed in copending application, Serial No. 587,983, filed May 29, 1956, by John Cleybergh, and includes a speed control actuator assembly secured to one side of the inner end of a rocker arm 44 in a manner set forth in that invention for rotation of the bell crank 201. The speed changing mechanism is shown in Figure 2 in the position it assumes when the turntable is set for 33⅓ r.p.m., the bell crank 201 being maintained in the position shown by a spring 233 connected at one end to a link 235 which is mounted for rotation on the stub shaft 48, and at the other end to a bifurcated lever 237 pivotally mounted by means of a pin 239 to an arm 241 forming an extension of the upper arm of the U-shaped bracket 227. A link 243 connects the link 235 with an arm 245 on the bell crank 201.

Upon rotation of the rocker arm 44 in a clockwise direction as viewed in Figure 2, pin 229 is moved in a counter-clockwise direction about the periphery of the washer 221 which is urged into engagement therewith by the spring 233. As the arm 241 moves with the rocker arm 44, tension is exerted on the spring 233 to urge the washer 221 into engagement with the pin 229. For this purpose, a pin 249 which is secured to a bracket 251 forming a part of the plate 21, is received within the bifurcated end of the link. When the rocker arm 44 reaches the limit of its oscillation about the axis of stub shaft 48, it is then rocked about a perpendicular axis in response to the contour of the groove 43 of the cam gear 29. As a result, pin 229 is raised out of engagement with the washer 221 to afford a sudden snapping action of the bell crank 201 about its axis of rotation. The pin 229 is again brought into the engagement with the arm 219 and the washer 221, with the adjacent end of the rocker arm 44 is moved downwardly in response to the contour of the groove 43. The resilient mounting of the pin 229 permits initial downward movement when the arm 219 is in interfering relation. When the edge of the washer 221 is cleared, the pin 229 snaps into position for engagement with the periphery of the washer. By this arrangement, the rocker arm 44 through the medium of the pin 229 rotates the bell crank 201 in one direction or the other, and moves the lever 217 to the right or to the left as viewed in Figure 2, depending upon the position of the bell crank 201 when the pin 229 is brought into engagement with the washer 221 to change the speed of the turntable to correspond to the requisite reproducing speed of a record dropped upon the turntable. The direction of rotation of the bell crank 201 is dependent upon the position of the bell crank when the pin 229 is oscillated in a clockwise direction, as viewed in Figure 2.

Figure 4:
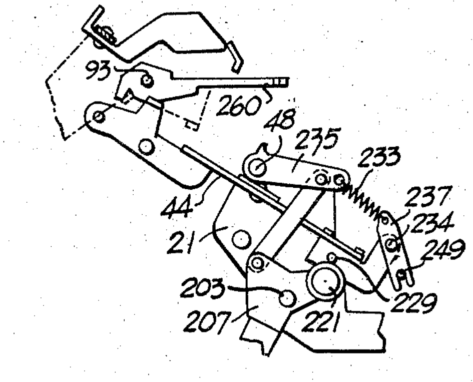
Figure 4 is a fragmentary bottom plan view of the automatic speed changing mechanism in the position it assumes when a record of large diameter is dropped upon the turntable.
Figure 5:
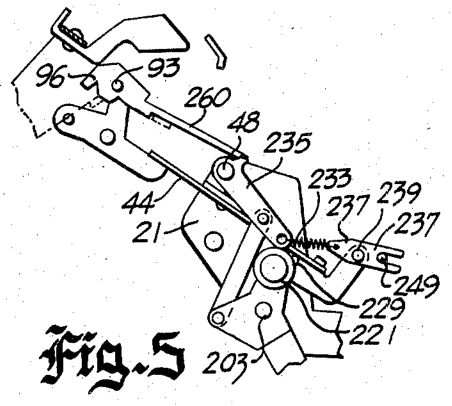
Figure 5 is a view similar to Figure 4, but showing the automatic speed changing mechanism in the position it assumes when a record of smaller diameter is deposited on the turntable.
Figure 6:
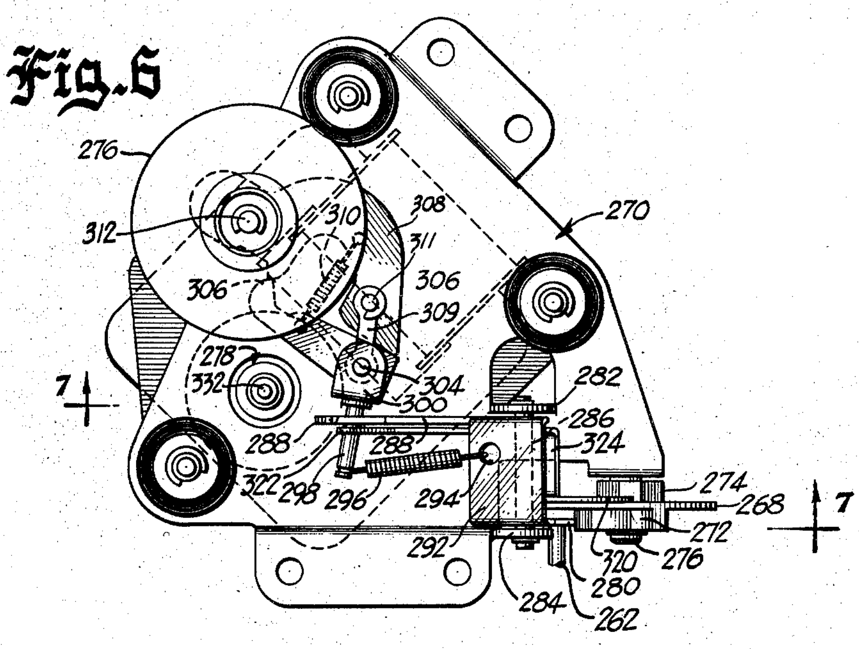
Figure 6 is a top plan view of the drive means of the invention in operative relationship with a motor therefor.
Figure 7:
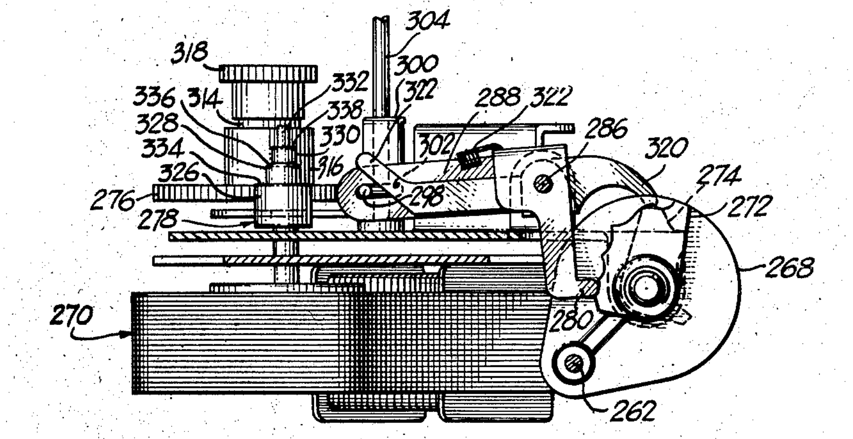
Figure 7 is a side elevational view of the means of Figure 6.

Referring to Figures 3, 4 and 5, the mechanism for determining the position of the bell crank 201 will now be described. An arm 260 extends outwardly from the bracket 96 and has a depending portion 262 which in the innermost position of the flag 90*a*, is brought to the position shown in Figure 5. In this position, rotation of the lever 235 in a counter-clockwise direction as viewed in this figure is prevented, and the bell crank 201 assumes a position in which the pin 229 engages the right side of washer 221 to afford counter-clockwise rotation of the bell crank and movement of the push rod 217 to the right, as viewed in Figure 2, to change the speed of the turntable to 45 r.p.m. The arm 260 assumes the position shown in Figure 5 only momentarily, i.e., the length of time that the flag 90*a* is in its innermost position. During this interval, further rotation of the lever 235 about the axis of the stub shaft 48 is prevented, and the pin 229 engages the washer 221 in the position shown in Figure 5.

In the event that a 10-inch record is dropped upon the turntable, the lever 235 may be rotated to the position shown in Figure 4 and the bell crank 201 assumes the position shown in that figure. In this position, the pin 229 engages the other side of the washer 221 and effects clockwise rotation of the bell crank 201 and movement of the push rod 217 to the left, as viewed in Figure 2, to change the speed of the turntable to 33⅓ r.p.m. The lever 235, of course, is freely rotatable on the stub shaft 48, and upon oscillation of the rocker arm 44 in a counter-clockwise direction, the bifurcated lever 237 is brought to the position shown in Figure 4 because of the varying relative positions of the pins 239 and 249. In moving to this position, movement of the lever 235 and the bell crank 201 to the positions shown is afforded. When rotation of the lever 235 is precluded by the position of the arm 260, the bifurcated lever 237 assumes the position shown in Figure 5, and the bell crank 201 is brought to a position in which the right side of the washer 221 is engaged by the pin 229.

In order to simplify and make highly effective the speed changing action of the rod 217, the invention contemplates a simple connection between the said rod at its outer end and a lever 262 (shown in Figures 2 and 6–9). Thus, a pair of upstanding, spaced apart and parallel lugs 264 and 266 may be mounted on the outer end of rod 217, to receive the lever 262, this lever being fixedly secured to a cam plate 268 of a motor 270. The cam plate or bracket 268 has integrally formed therewith a pair of individually formed cams 272 and 274 for effecting a vertically variable relationship between a tire 276 and a driven spindle 278, as hereinafter further set forth. The movement of the arm 217 is relatively free vertically to permit the requisite movement of the lever 262, as confined within lugs 264 and 266 sufficiently closely to provide angular rotation of the plate or bracket 268 in response to axial movement of the rod 217.

Figure 8:
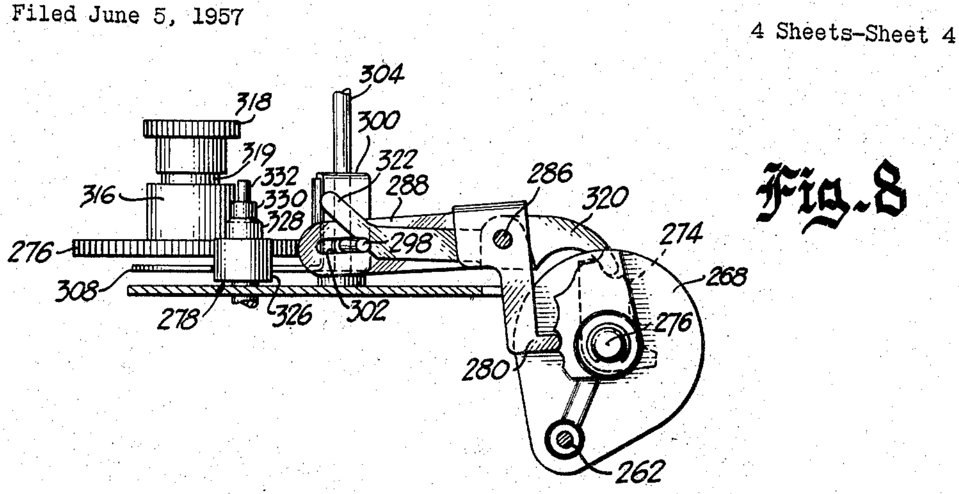
Figure 8 is a fragmentary side elevational view corresponding to the view of Figure 7.
Figure 9:
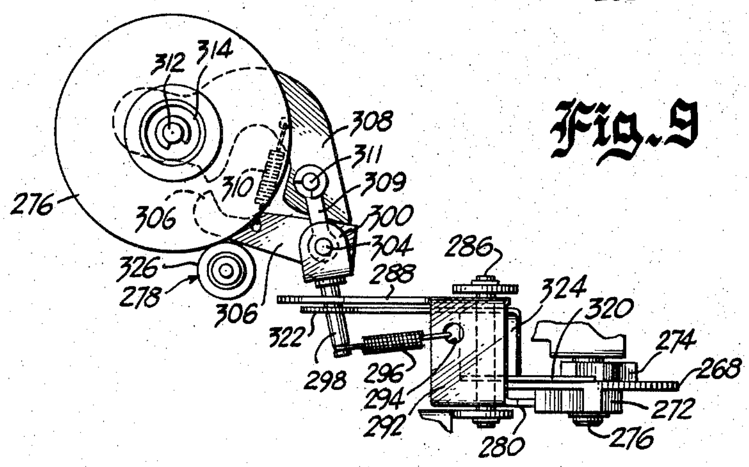
Figure 9 is a fragmentary top plan view substantially corresponding to the view of Figure 6.
Figure 10:
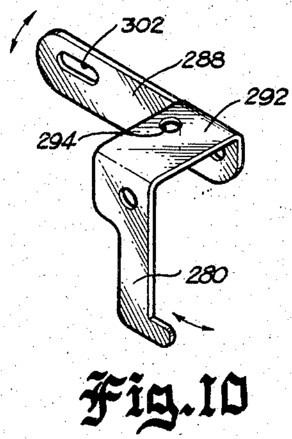
Figure 10 is a detailed perspective view of lever means shown in Figures 6–8.
Figure 11:
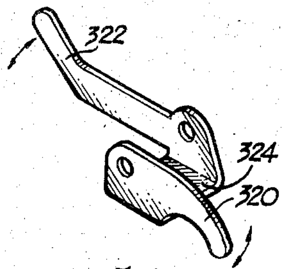
Figure 11 is a detailed perspective view of a lever coacting with the lever of Figure 9 in adjusting the speed of the turntable.
Figure 12:
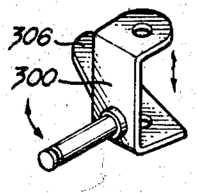
Figure 12 is a detailed perspective view of pivot means actuated by the means of Figure 9.

As seen more readily in Figure 8, the cam structure 272 engages a camming finger 280 along its upper edge which is pivotally mounted on the motor 270 by means of a pair of trunnions 282 and 284 carrying a journal bar 286. An extension 288 is held in spaced, parallel relationship with the camming finger 280 by means of a U-shaped pivot bridge 292 integrally formed therewith, the bridge defining an aperture 294 having secured therein one end of a spring 296, whose other end engages a pin 298 on a U-shaped pivot member 300. The pin 298 is received in a slot 302 defined in the extension 288 so that adequate lost-motion is afforded to permit raising and lowering of the pivot member 300 during angular rotation of the cam plate 268 and the cam 272 effective to actuate the finger 280.

The pivot member 300 is slidably mounted on a vertical shaft 304 for this purpose and has integrally formed therewith a stop bar 306 in normally abutting engagement at its outer end with a bar 308 pivotally supported on the shaft 304 by means of a double sleeve bracket 309 and biased toward bar 306 by an interconnecting spring 310. Thus, the bracket 309 pivotally carries a shaft 311 at its outer end affixed to the bar 308. The bar 308 carries the tire 276 by means of an upstanding shaft 312. Thus, the tire 276 is fixedly mounted upon a sleeve 314, preferably by a collar 316, while carrying at its upper end a wheel 318 of relatively reduced diameter for frictionally engaging the rim of the turntable to rotate the same. Removal and replacement of the tire 276 is therefore an extremely simple procedure inasmuch as the sleeve 314 is slidably disposed upon the shaft 312.

Thus, free lateral movement of the tire 276 is afforded, the tire being biased into engagement with the spindle 278. It must be noted in this connection that the diameter of the tire 276 must be calibrated precisely with the diameter of the spindle 278 and its steps, so that the spindle will not "grind in" on the tire. Even the smallest diameter of the spindle will not produce this type of wear, the tire itself being injection molded for this purpose so that any indentation in the tire will roll out within several rotations of the wheel. The motor is preferably on a floating support 20 as to accommodate more of the contact pressures on the tire 276; and it will also be understood that the motor 270, which is a two-pole motor, may be a four-pole and that the device of the invention is, as stated, adapted for use with direct drive as well as with automatic speed change.

Lateral movement of the tire assembly 276 is effected by means of the second cam element 274 whose angular rotation serves to cam a lever 320 and thereby pivot a camming bar 322 extending in parallel spaced relationship thereto by a bridge element 324 journalled on the journal bar 286. The outer end of the bar 322 is inclined upwardly and is in abutting engagement with the pin 298 whereby the pin, and the wheel 276, are moved laterally by the stop bar 306 in its contact with the bar 308.

The spindle 278 is provided with a series of successively reduced steps 326, 328, 330 and 332, corresponding to different speeds of rotation to be imparted to the tire 276 (i.e., 16, 33⅓, 45 and 78 r.p.m.), and it will be noted that the shoulder 334 connecting the steps 326 and 328 is relatively sharp and relatively wide; whereas the shoulder 336 connecting the steps 328 and 330 is relatively narrow and bevelled upwardly. However, the shoulder 338 connecting steps 330 and 332 is again relatively sharp. In order to afford easy movement of the tire over these steps, the cam 274 is configured in such a way as to draw the tire 276 outwardly away from the sharp shoulder 334 between steps 326 and 328 during vertical movement of the tire therepast, while permitting the tire to cam and slide gradually over the shoulder 336 between the steps 328 and 330, while the tire 276 is again moved outwardly away from the shoulder 338 during its vertical progress thereover, so that the entire motion is accomplished easily, smoothly, and without interruption.

Accordingly, automatic adjustment of the turntable speeds by means of the axial movement of the rod 217 is readily achieved; and, if desired, rotation of the turntable at 16 or 78 r.p.m. may be obtained by use of a lever 149*a* which is rotated by a manual control knob (not shown) forming a part of the assembly 122 so that the tire 276 is positioned in driven relationship to the appropriate step of the spindle 278. The vertical and lateral camming actions for movement of the tire 276 relative to the spindle are effected by the simultaneous movements of the cams 272 and 274 mounted on the cam plate or bracket 268, so that the movements of both are necessarily perfectly synchronized.

The operation of the speed-change means will be readily understood from the preceding discussion; and, for example, should a record of 10-inch diameter be dropped on the turntable, the bell crank 201 will assume the position in Figure 4 to actuate rod 217 to the left and change the speed to 33⅓ r.p.m. If, however, the next record is also 10 inches in diameter, the position of the tire relative to the spindle remains unchanged. Dropping of a record of 7-inches diameter, however, will cause bell crank 201 to assume the position of Figure 5, and the tire 276 will then be moved to the step 332 position on the spindle 278 until a record of diameter greater than 7 inches is dropped on the turntable.

Although I have herein described and set forth my invention with respect to certain specific principles and details thereof, it will be understood by those skilled in the art that these may be modified without departing from the spirit and scope of the invention as set forth in the hereunto appended claims.

I claim:

1. In a record changer, a motor carrying a driven spindle having a plurality of coaxial steps of successively reduced diameter, a tire biased into contact with said spindle and having drive means coaxially mounted therewith for driving the turntable of the record changer, a cam plate pivotally mounted on said motor and having a pair of integrally formed cams thereon, a lever biased into engagement with each of said cams, one of said levers having fixedly secured thereto an extension defining a lost motion slot, pin means slidably and pivotally mounted on said motor for movement in said lost motion slot, a camming extension on the other of said levers adapted to cam said pin means, a stop bar fixedly secured to said pin means, and means pivotally supported on said pin means and movable by said stop bar for supporting said tire, said first named lever and cam engaged therewith being adapted to effect vertically slidable movement of said tire and said second lever and cam engaged therewith being adapted to effect lateral movement of said tire, said cams being complementary to provide synchronized movement relative to said steps.

2. In a record changer, a motor carrying a driven spindle having a plurality of coaxial steps of successively reduced diameter, a tire biased into contact with said spindle and having drive means coaxially mounted therewith for driving the turntable of the record changer, a cam plate pivotally mounted on said motor and having a pair of integrally formed cams thereon, a lever biased into engagement with each of said cams, one of said levers having fixedly secured thereto an extension defining a lost motion slot, pin means slidably and pivotally mounted on said motor for movement in said lost motion slot, a camming extension on the other of said levers adapted to cam said pin means, a stop bar fixedly secured to said pin means, a support bar pivotally mounted on said pin means and spring-connected to said stop bar, said support bar being movable by said stop bar for supporting said tire in frictional engagement with said spindle, said first named lever and cam engaged therewith being adapted to effect vertically slidable movement of said tire and said second lever and cam engaged therewith being adapted to effect lateral movement of said tire, said cams being complementary to provide synchronized movement relative to said steps.

3. In a record changer, a motor carrying a driven spindle having a plurality of coaxial steps of successively reduced diameter, a tire biased into contact with said spindle and having drive means coaxially mounted therewith for driving the turntable of the record changer, a cam plate pivotally mounted on said motor and having a pair of integrally formed cams thereon, a lever biased into engagement with each of said cams, one of said levers having fixedly secured thereto an extension defining a lost motion slot, pin means slidably and pivotally mounted on said motor for movement in said lost motion slot, a camming extension on the other of said levers adapted to cam said pin means, a stop bar fixedly secured to said pin means, a support bar pivotally mounted on said pin means and spring-connected to said stop bar, said support bar being movable by said stop bar for supporting said tire in frictional engagement with said spindle, said tire having a predetermined diameter relative to said spindle and the smallest diameter step thereof such as to preclude distortions of the peripheral surfaces of said tire, said first named lever and cam engaged therewith being adapted to effect vertically slidable movement of said tire and said second lever and cam engaged therewith being adapted to effect lateral movement of said tire, said cams being complementary to provide synchronized movement relative to said steps.

4. In a record changer, a motor carrying a driven spindle having a plurality of coaxial steps of successively reduced diameter, a tire biased into contact with said spindle and having drive means coaxially mounted therewith for driving the turntable of the record changer, a cam plate pivotally mounted on said motor and having a pair of integrally formed cams thereon, a lever biased into engagement with each of said cams, one of said levers having fixedly secured thereto an extension defining a lost motion slot, pin means slidably and pivotally mounted on said motor for movement in said lost motion slot, a camming extension on the other of said levers adapted to cam said pin means, a stop bar fixedly secured to said pin means, a support bar pivotally mounted on said pin means and spring-connected to said stop bar, said support bar being movable by said stop bar for supporting said tire in frictional engagement with said spindle, said support bar having affixed thereto a shaft and said tire being mounted upon a sleeve adapted for axially slidable movement on said shaft and readily removable therefrom, said tire having a predetermined diameter relative to said spindle and the smallest diameter step thereof such as to preclude distortions of the peripheral surfaces of said tire, said first named lever and cam engaged therewith being adapted to effect vertically slidable movement of said tire and said second lever and cam engaged therewith being adapted to effect lateral movement of said tire, said cams being complementary to provide synchronized movement relative to said steps.

5. In a record changer, a driven spindle having a plurality of axially successively reduced steps, each step corresponding to a standard rate of turntable rotation, a tire biased into contact with said spindle and having a predetermined diameter calibrated in accordance with the diameter of said steps whereby to prevent grind-in and distortional wear of the tire, said tire having drive means coaxially affixed thereto for driving the turntable of the record changer, means supporting said tire for laterally pivotal and vertically slidable movement including a laterally extending member, cam means adapted to effect laterally pivoting movement of said tire including a follower engaging said member for moving it laterally, cam means adapted to effect vertically slidable movement of said tire including a follower cooperating with said follower and engaging said member for moving it vertically, said followers comprising elements movable by said cam means respectively in opposite directions with respect to each other while in engagement with said member, said vertical and lateral movements being calibrated in accordance with the configurations of said steps by said cam means for effecting lateral movement and said cam means for effecting vertical movement sequentially.

6. In a record changer, a driven spindle having a plurality of axially successively reduced steps, each step corresponding to a standard rate of turntable rotation, a tire biased into contact with said spindle and having a predetermined diameter calibrated in accordance with the diameter of said steps whereby to prevent grind-in and distortional wear of the tire, said tire having drive means coaxially affixed thereto for driving the turntable of the record changer, means supporting said tire for laterally pivotal and vertically slidable movement including a laterally extending member, cam means adapted to effect laterally pivotal movement of said tire including a follower element engaging said member for moving it laterally, cam means adapted to effect vertically slidable movement of said tire including a follower element engaging said member for moving it vertically, said follower elements being moved in opposite directions with respect to each other while in engagement with said member and said vertical and lateral movement being calibrated in accordance with the configurations of said steps by said cam means for effecting lateral movement and vertical movement sequentially.

References Cited in the file of this patent

UNITED STATES PATENTS 2,746,316 Nisenson ---------------- May 22, 1956

2,801,546 Scheller et al. ------------ Aug. 6, 1957

FOREIGN PATENTS 714,813 Great Britain ---------- Sept. 1, 1954